United States Patent [19]

Segawa et al.

[11] Patent Number: 5,818,612
[45] Date of Patent: Oct. 6, 1998

[54] SCANNING METHOD AND APPARATUS FOR PRE-SCANNING DOCUMENT TO ALLOW MANUAL ADJUSTMENT OF ITS ORIENTATION

[75] Inventors: Satoshi Segawa; Atsushi Kashitani, both of Tokyo, Japan

[73] Assignee: NEC Corporation, Tokyo, Japan

[21] Appl. No.: 563,964

[22] Filed: Nov. 29, 1995

[30] Foreign Application Priority Data

Nov. 29, 1994 [JP] Japan ................................. 6-291460
Jan. 26, 1995 [JP] Japan ................................. 7-028934

[51] Int. Cl.⁶ ............................................. H04N 1/04
[52] U.S. Cl. .......................... 358/494; 358/474; 358/488
[58] Field of Search .................................. 358/494, 474, 358/488, 448, 400, 479, 497, 505; 382/318, 319

[56] References Cited

U.S. PATENT DOCUMENTS

| | | | |
|---|---|---|---|
| 4,752,891 | 6/1988 | Van Deale et al. | 358/474 |
| 5,128,777 | 7/1992 | Uno | 358/448 |
| 5,182,728 | 1/1993 | Shen et al. | 364/413.25 |
| 5,295,204 | 3/1994 | Parulski | 358/479 |

*Primary Examiner*—Thomas D. Lee
*Attorney, Agent, or Firm*—Sughrue, Mion, Zinn, Macpeak & Seas, PLLC

[57] ABSTRACT

In an image scanner, a controller is responsive to a start command for line-scanning a document to produce a line-scan signal and providing a display of the line-scan signal on a viewing screen. While this sequence proceeds from a start position towards the end of a full scan, the user is allowed to reposition the document by viewing the screen if its orientation needs correction. The process continues until a stop command is produced or until the line-scan reaches the end of the full scan area, whichever is earlier. In response to the stop command, the controller restarts the line-scanning and display sequence from the start position to provide a full-scan of the material.

15 Claims, 4 Drawing Sheets

SCANNING METHOD AND APPARATUS FOR PRE-SCANNING DOCUMENT TO ALLOW MANUAL ADJUSTMENT OF ITS ORIENTATION

BACKGROUND OF THE INVENTION

1. Field of the Invention

The present invention relates to an image scanning technique using a linear image sensor for producing a high-resolution image.

2. Description of the Related Art

Conventional image scanners require users to wait until a document is scanned across its full length before its orientation can be adjusted if the first scan reveals that the document is misoriented. Since the image of a printed document is not necessarily parallel with the direction of the main (horizontal) scan even though the orientation of the document itself is correct, the user has to make an adjustment of the document's orientation and operate the scanner. If this adjustment is not precise, the adjustment of the document and the operation of the scanner are repeated until the document is correctly oriented. This is a time consuming and tedious affair.

SUMMARY OF THE INVENTION

It is therefore an object of the present invention to provide a scanning technique whereby the document is first scanned in a prescan mode in which the user is allowed to adjust the orientation of the document where necessary and then the document is scanned in a full scan mode.

A further object of the present invention is to provide an image scanner which does not require the use of a flat base on which documents would otherwise be placed by eliminating the repeated repositioning adjustments of a document directly placed on a desk surface.

According to a first aspect of the present invention, a material to be scanned is line-scanned in the direction of its length and a line scan signal is produced during a prescan mode and a display of the line scan signal is displayed to produce an image of a scanned line. This process is repeated to produce a two-dimensional image until a user issues a stop command and the prescan mode is terminated. During a full scan mode, the process is repeated again from the start and continued until a full area of the material is line-scanned.

According to a second aspect of the present invention, a material to be scanned is full-scanned and a low-resolution two-dimensional image signal is produced during a prescan mode and the two-dimensional image signal is displayed to produce a low-resolution image of the material. The material is then line-scanned and a high-resolution line scan signal is produced during a full scan mode and the line scan signal is displayed to produce a high-resolution image of a scanned line. This process is repeated until a high-resolution two-dimensional image of the material is produced. Preferably, the user specifies a scan area which is displayed on a foreground of the low-resolution image of the material, and the line scan signal is displayed to produce a high-resolution line image within the specified scan area.

BRIEF DESCRIPTION OF THE DRAWINGS

The present invention will be described in further detail with reference to the accompanying drawings, in which.

DETAILED DESCRIPTION

Figure 1:
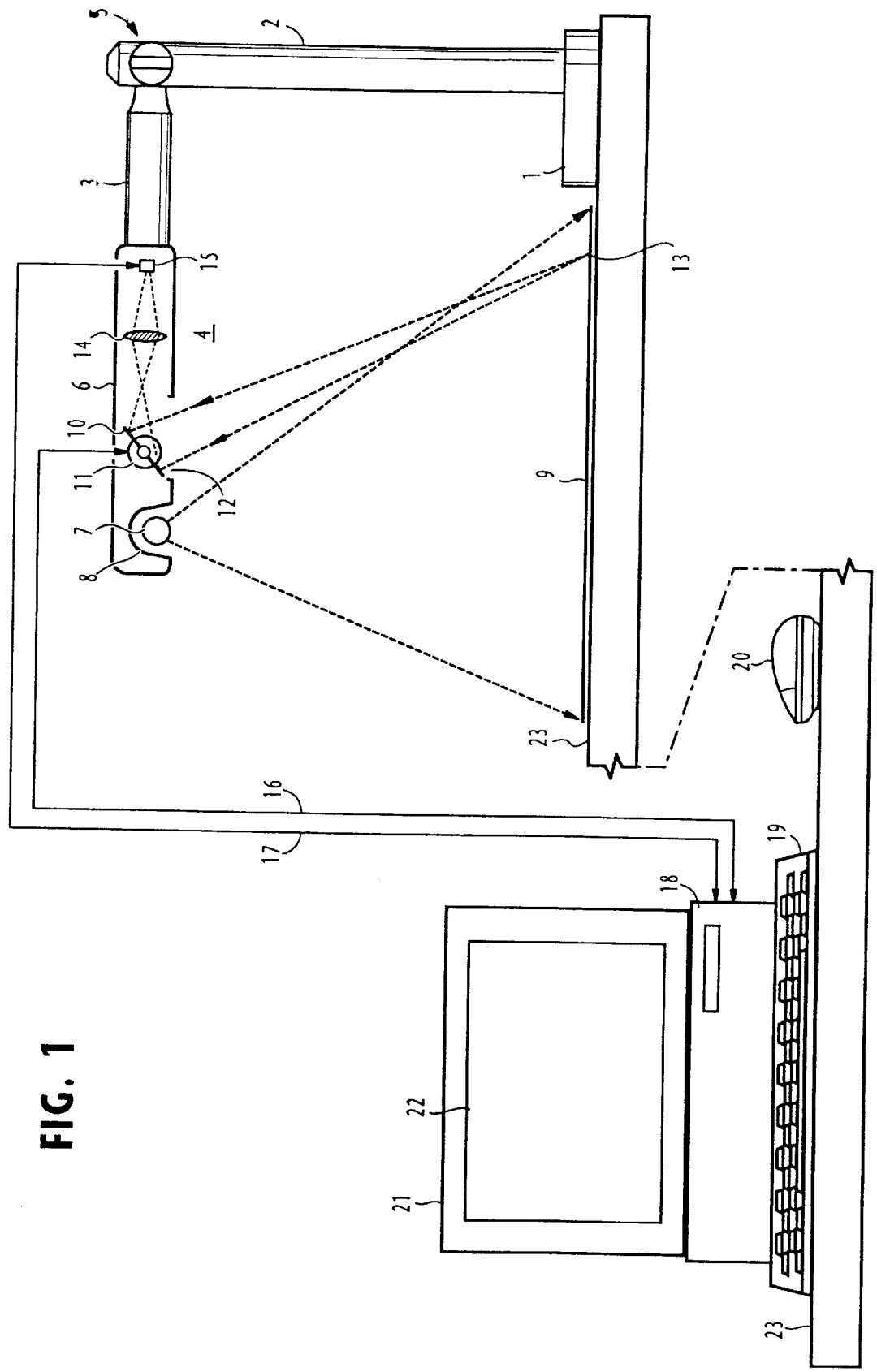
FIG. 1 is a view illustrating an overhead scanner according to a first embodiment of the present invention along with a computer system employed for operating the scanner.

In FIG. 1, the overhead scanner of the present invention generally comprises a base 1 placed on a desk surface 23, an upstanding arm 2 secured to the base for pivotally supporting a support arm 3, and a scanner head 4 connected to the support arm 3. Arm 3 is firmly secured to the upstanding arm 2 by means of a fastening device 5 so that the head 4 is held parallel to, and at a predetermined height (e.g., 40 cm) from, the desk surface.

Scanner head 4 comprises a housing 6 secured to the distal end of arm 3, and a light source 7 suitably mounted within a shade 8 for uniformly illuminating a portion of the desk surface 23 in which a sheet 9 of textual or pictorial material of usually A-4 size is placed. An elongated mirror 10 is secured to a mirror driver, or a voice coil motor 11 so that the mirror is rotated about its horizontal axis to collect light rays through an opening 12 from a line 13 to be scanned. Light reflecting off the mirror is focused by a focusing lens 14 onto a linear CCD (charge-coupled device) image sensor 15. With the scanner head 4 being held at the predetermined height from the desk surface and the lens 14 being adjusted appropriately, the image of the scanned line 13 is precisely focused by lens 14 onto the linear image sensor 15.

Mirror driver 11 and linear image sensor 15 are connected by lines 16 and 17 to a computer 18 to which a keyboard 19 and a pointing device, or mouse 20 are connected. A display unit 21 is mounted on the computer unit to provide a display of a scanned image on a video screen 22. Preferably, a servo-control mechanism, as disclosed in a co-pending U.S. patent application Ser. No. 0/8,490,572, filed Jun. 15, 1995 and assigned to the same assignee as the present invention, is used for controlling the mirror driver 11.

Figure 2:
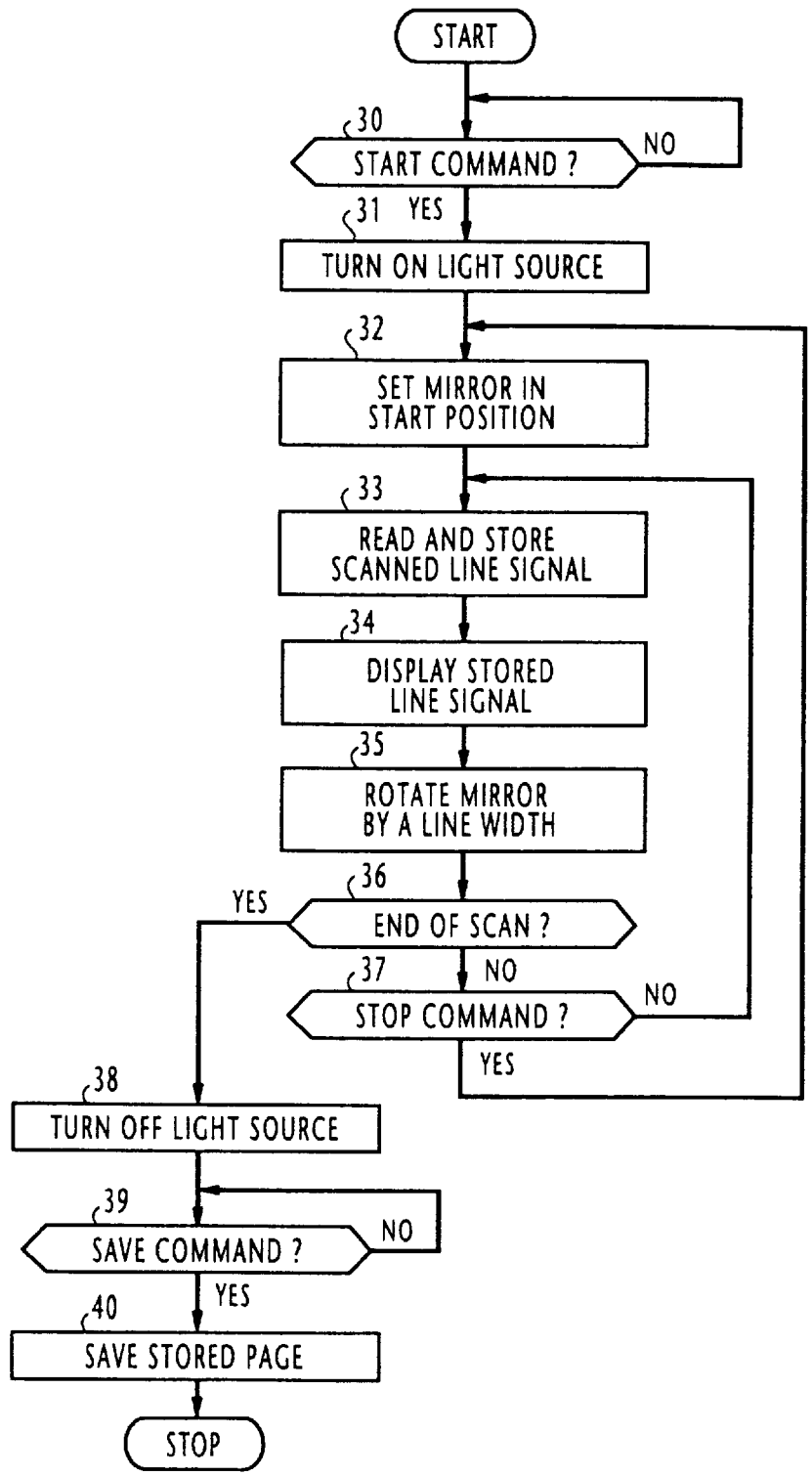
FIG. 2 is a flowchart illustrating the operation of the computer in a scan mode according to the first embodiment of this invention.

Computer 18 operates the scanner head 4 according to the flowchart of FIG. 2. During a scan mode, the operation of computer 18 starts with block 30 by accepting a "start command" from the keyboard 19 or pointing device 20. Flow proceeds to block 31 where the computer turns on the light source 7 to illuminate the material 9 to be scanned and controls the mirror driver 11 so that mirror 10 is set in the start position (block 32).

Flow proceeds to block 33 to read the output of the linear image sensor 15 and stores it in the random access memory of the computer. The stored signal is then displayed on the screen 22 (block 34) and the mirror driver 11 is controlled to rotate the mirror 10 by an angle corresponding to the width of a line to be scanned (block 35). A test is then made in decision block 36 to determine whether the end of a scan is reached. The computer 18 does this by counting the number of lines scanned and recognizing the end of a scan when the scanned line number reaches a predetermined value.

Before the predetermined line number is reached, flow proceeds from block 36 to block 37 to check to see if a "stop command" is entered from the keyboard 19. If not, flow returns to block 33 to repeat the line scanning process.

As long as blocks 33 to 37 are repeatedly executed, the scanned line is successively shifted in the sub-scan (vertical)

direction across the length of the document and the area of displayed images on screen 22 increases. By viewing the screen 22, the user can determine whether the orientation of the displayed images (rows of characters in a printed text or lines in artwork) are aligned precisely with the direction of the main (horizontal) scan of the linear image scanner 15. If the orientation of the displayed image is not correct, the user can repeatedly readjust the orientation of the sheet 9 by viewing the screen 22 as the line scan proceeds. When the user determines that the document 9 is correctly oriented, the "stop command" is entered to the computer 18. In response, flow exits block 37 and returns to block 32 to set the mirror 10 in the start position to repeatedly execute blocks 33 to 37. Since the scanned material is correctly oriented during the first scan cycle (prescan mode), no stop command is issued, and the end of scan is eventually detected in block 36. Flow proceeds from block 36 to block 38 where the computer turns off the light source 7. A scanned full-page image is now stored in the computer's memory. If the user desires to save the stored image in a secondary storage such as hard disk, a "save command" is entered to the computer (block 39). In block 40, the computer saves the stored image in the hard disk.

If readjustments are made and a stop command is entered to the computer during the prescan mode, the process is repeated from the beginning during a second scan cycle (full scan mode). In his case, the user is only required to enter a stop command and the rescan process needs to be performed only once. Since the prescan mode can be terminated well before the end of a full scan across the length of the document, the total scan period can be significantly reduced in comparison with conventional scanners.

If the scanned material is correctly oriented when it is initially placed in position, the user may recognize this from the screen 22 and does not enter a "stop command". In this case, end-of-scan condition is detected during the first scan cycle and the scanned material is saved, eliminating the need to provide a second scan cycle.

Figure 3:
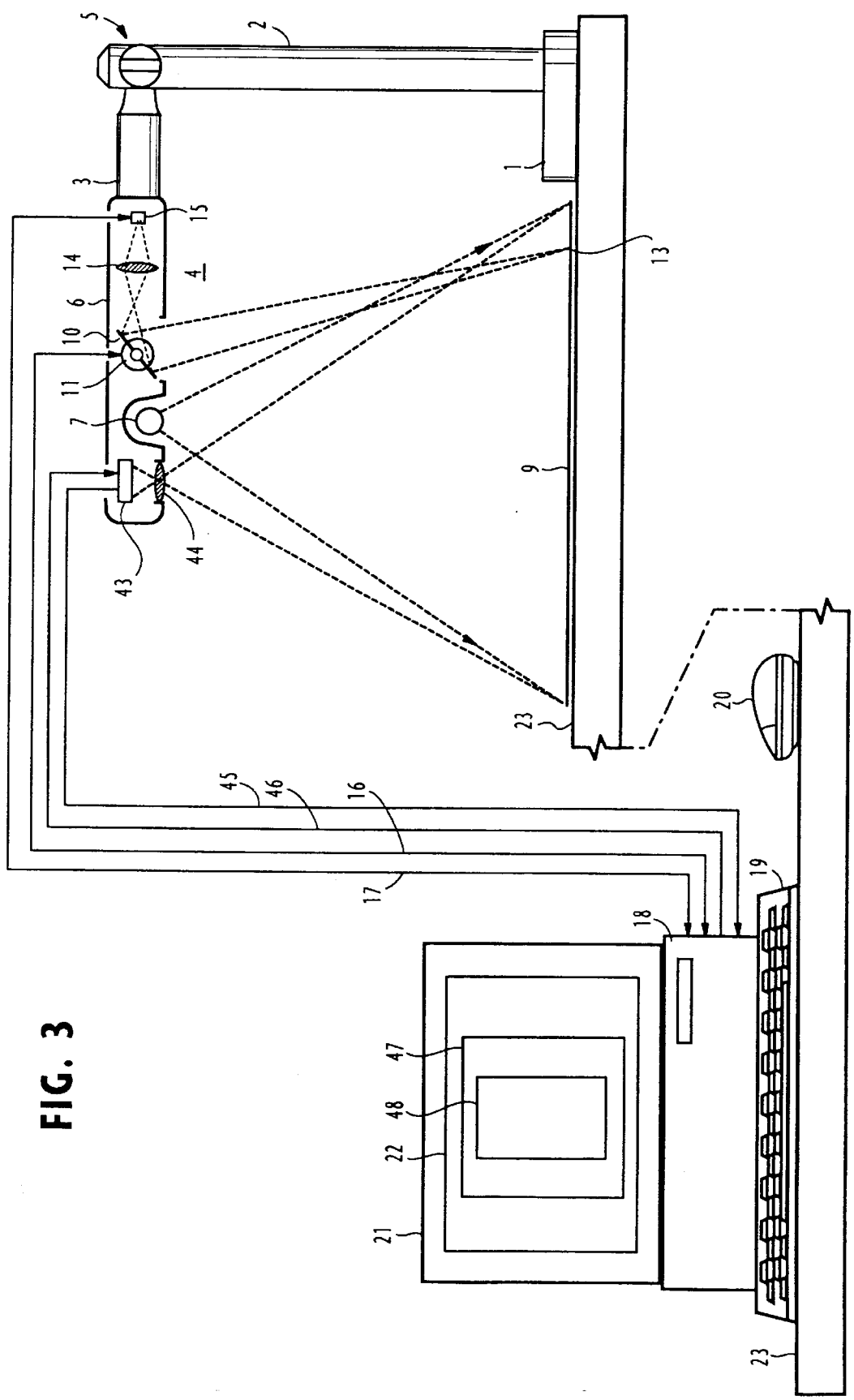
FIG. 3 is a view illustrating an overhead scanner and a computer system according to a second embodiment of the present invention.

A second embodiment of the present invention is shown in FIG. 3 which differs from the previous embodiment in that the scanner head 4 additionally includes a two-dimensional (area) image sensor 43 mounted above a focusing lens 44 for receiving light from an area that is sufficiently larger than the size of documents to be scanned. The area image sensor 43 is a charge-coupled device having a resolving power that is much lower than that of the linear image sensor 15 for low-cost implementation. The area image sensor 43 is connected by lines 45 and 46 to the computer 18 to apply thereto a sensed two-dimensional image signal in response to a read command input.

Figure 4:
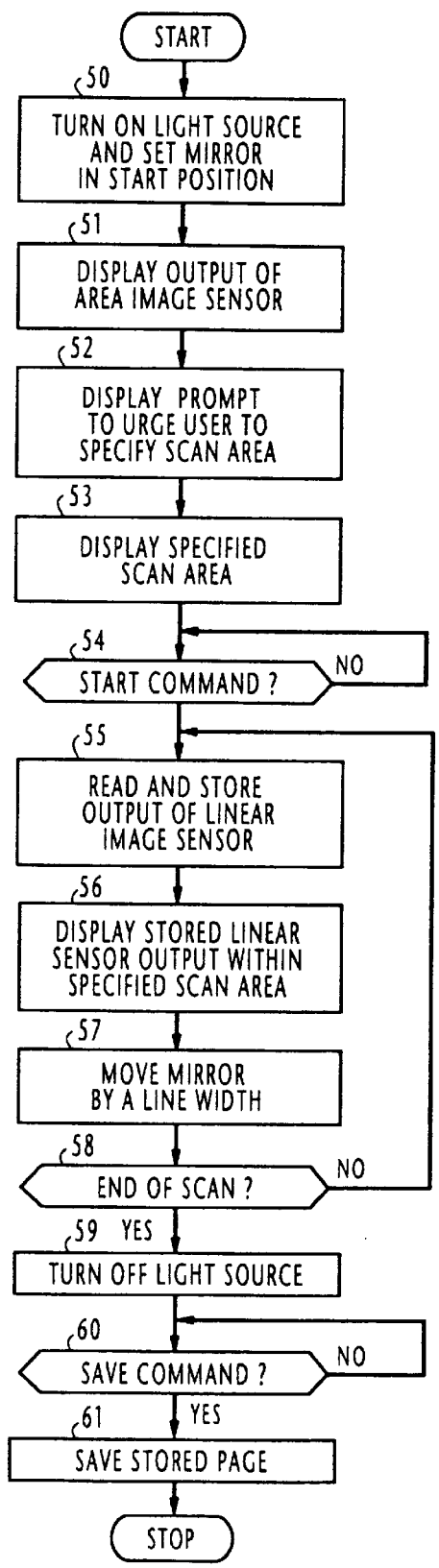
FIG. 4 is a flowchart illustrating the operation of the computer in a scan mode according to the second embodiment of this invention.

The operation of the computer 18 in a scan mode according to the second embodiment proceeds according to the flowchart of FIG. 4. With a document 9 being placed below the scanner head 4, the computer's scan-mode operation starts with block 50 where the computer turns on the light source 7 to illuminate the document and sets the mirror 10 in the start position. Flow proceeds to block 51 to read and display the output of area image sensor 43 so that the image of the document 9 as well as its surrounding areas appears on screen 22 as indicated by numeral 47.

A prompt urging the user to specify a scan area is displayed (block 52). The user is urged to specify a scan area within the document by manipulating the pointing device 20 or keyboard 19 (block 53), causing a coordinate-system command to be entered to the computer. As a result, the specified scan area is displayed on the foreground of the low-resolution image of the document 9 as indicated by numeral 48 in FIG. 3. Where necessary, the user corrects the orientation of the document while viewing its low-resolution image on screen 22, using the specified scan area 48 as a reference. On recognizing that the document is correctly oriented, the user enters a start command (block 54).

In block 55, the computer reads and stores the output of linear image sensor 15 into the computer's RAM. The scored line image is displayed within the specified area 48 (block 56). Mirror 11 is rotated by an angle corresponding to the width of a line (block 57), and a check is made in block 58 to see if the bottom of the specified scan area is reached. If not, flow returns from block 58 to block 55 to repeat the line scanning process until flow exits block 58, producing a high-resolution image of the specified area of the document 9. Light source 7 is then turned off (block 59). When a save command is entered (block 60), the high-resolution image is saved in the secondary storage of the computer.

What is claimed is:

1. A scanning method comprising the steps of:
   a) line-scanning a material to be scanned and producing a line scan signal;
   b) providing a display of the line scan signal to produce an image of a scanned line;
   c) repeating steps (a) and (b) to produce a two-dimensional image of said material during a prescan mode whereby a user may correctly orient said material by viewing the image and enter a stop command and terminating the prescan mode in response to entry of said stop command; and
   d) repeating steps (a) and (b) to produce a two-dimensional image of said material during a full scan mode and terminating the full scan mode when said material is fully line-scanned.

2. A scanning method comprising the steps of:
   a) line-scanning a material to be scanned and producing a line scan signal;
   b) providing a display of the line scan signal to produce an image of a scanned line;
   c) repeating steps (a) and (b) to produce a two-dimensional image of said material, whereby a user may correctly orient said material by viewing the image and enter a stop command, and terminating steps (a) and (b) when at least one of the stop command is entered and when the material is fully line-scanned, whichever is earlier; and
   d) if said stop command is entered, repeating steps (a) and (b) to produce a two-dimensional image of said material until said material is fully line-scanned.

3. A scanning method comprising the steps of:
   a) rough-scanning;
   b) providing a display of the two-dimensional image signal to produce a low-resolution image of said material, whereby a user may correctly orient said material by viewing the low-resolution image and enter a start command;
   c) fine-scanning said material in response to entry of said start command and producing a high-resolution two-dimensional image signal; and
   d) providing a display of the two-dimensional image signal to produce a high-resolution image of said material.

4. A scanning method comprising the steps of:
   a) rough-scanning a material to be scanned and producing a low-resolution two-dimensional image signal;

b) providing a display of the two-dimensional image signal to produce a low-resolution image of said material of said material;

c) providing a display of a scanned area on a foreground of said low-resolution image according to a coordinate signal entered by a user whereby the user can correctly orient said material by viewing the low-resolution image with reference to the scanned area and enter a start command;

d) fine-scanning said material in response to entry of said start command and producing a high-resolution two-dimensional image signal; and e) providing a display of the two-dimensional image signal within said scan area to produce high-resolution image of said material.

5. A method for operating a scanner, the scanner comprising a linear image sensor, means for focusing light from a portion of a surface to said linear image sensor, means for moving said focusing means so that said portion is successively shifted by the width of a line, entry means for receiving commands from a user, and a display unit, said method comprising the steps of:

a) causing said moving means to set the focusing means in a start position when a start command is accepted by said entry means;

b) storing an output signal from said linear image sensor in a memory, and providing a display of the stored output signal on said display unit;

c) causing said moving means to move said focusing means;

d) repeating steps (b) and (c) until a stop command is accepted by said entry means or until said focusing means reaches an end position, whichever is earlier; and e) if said stop command is accepted by said entry means, causing said moving means to set the focusing means in said start position and repeating steps (b) and (c) until said focusing means reaches said end position.

6. A method as claimed in claim 5, further comprising the steps of:

f) receiving a save command from said entry means; and g) saving the output signal of said linear image sensor stored in said memory in a secondary storage.

7. A method for operating a scanner, the scanner comprising a low-resolution, two-dimensional image sensor for producing an output signal representing a low-resolution two-dimensional image of a scanned material, a high-resolution, linear image sensor for producing an output signal representing a high-resolution linear image of the scanned material, means for focusing light from a portion of the scanned material to said linear image sensor, means for moving said focusing means so that said portion is successively shifted by the width of a line, entry means for receiving commands from a user, and a display unit, said method comprising the steps of:

a) providing a display of the output signal of the two-dimensional image sensor on said display unit to produce said low-resolution two-dimensional image;

b) receiving a start command from said entry means;

c) storing an output signal from said linear image sensor in a memory and providing a display of the stored output signal on said display unit to produce said high-resolution linear image on a foreground of the two-dimensional image;

d) causing said moving means to move said focusing means from a start position; and e) repeating steps (c) and (d) until the focusing means reaches an end position.

8. A method as claimed in claim 7, further comprising the steps of:

f) receiving a save command from said entry means; and g) saving the output signal of said linear image sensor stored in said memory in a secondary storage.

9. A method for operating a scanner, the scanner comprising a low-resolution, two-dimensional image sensor for producing an output signal representing a low-resolution two-dimensional image of a scanned material, a high-resolution, linear image sensor for producing an output signal representing a high-resolution linear image of the scanned material, means for focusing light from a portion of the scanned material to said linear image sensor, means for moving said focusing means so that said portion is successively shifted by the width of a line, entry means for receiving commands from a user, and a display unit, said method comprising the steps of:

a) providing a display of the output signal of the two-dimensional image sensor on said display unit to produce said low-resolution two-dimensional image;

b) receiving a coordinate-system command from said entry means and providing a display of a scan area according to the coordinate-system command on a foreground of said low-resolution two-dimensional image;

c) receiving a start command from said entry means;

d) storing an output signal from said linear image sensor in a memory and providing a display of the stored output signal on said display unit to produce said high-resolution linear image within said scan area;

e) causing said moving means to move said focusing means from a start position; and f) repeating steps (c) to (e) until the focusing means reaches an end position.

10. A method as claimed in claim 9, further comprising the steps of:

g) receiving a save command from said entry means; and h) saving the output signal of said linear image sensor stored in said memory in a secondary storage.

11. A scanner comprising:

a linear image sensor;

means for focusing light from a portion of a scanned material to said linear image sensor;

means for moving said focusing means so that said portion is successively shifted by the width of a line;

entry means for receiving commands from a user;

a display unit; and control means responsive to a start command from said entry means for reading an output signal from said linear image sensor, providing a display of the read output signal on said display unit, causing said moving means to move said focusing means from a start position and to continue moving said focusing means until a stop command is received from said entry means or until said focusing means reaches an end position, whichever is earlier, said control means being responsive to said stop command for causing said moving means to restart moving said focusing means from said start position to said end position and continuously reading the output signal of said linear image sensor and providing a display of the continuously read output signal on said display unit.

12. A scanner as claimed in claim 11, further comprising means for supporting said linear image sensor, said focusing means and said moving means above said scanned material.

13. A scanner comprising:

a low-resolution, two-dimensional image sensor for producing an output signal representing a low-resolution two-dimensional image of a scanned material;

a high-resolution, linear image sensor for producing an output signal representing a high-resolution linear image of the scanned material;

means for focusing light from a portion of the scanned material to said linear image sensor;

means for moving said focusing means so that said portion is successively shifted by the width of a line;

entry means for receiving commands from a user;

a display unit; and control means for providing a display of the output signal of the two-dimensional image sensor on said display unit to produce said low-resolution two-dimensional image, the control means being responsive to a start command from said entry means for reading an output signal from said linear image sensor, providing a display of the read output signal on said display unit to produce a plurality of said high-resolution line images on a foreground of said two-dimensional image, and causing said moving means to move said focusing means from a start position to an end position.

14. A scanner as claimed in claim 13, wherein said control means is responsive to a coordinate-system command from said entry means for providing a display of a scan area in said foreground of said two-dimensional image according to the coordinate-system command and providing a display of the read output signal on said display unit to produce said high-resolution line images within said scan area.

15. A scanner as claimed in claim 13, further comprising means for supporting said two-dimensional image sensor, said linear image sensor, said focusing means and said moving means above said scanned material.

* * * * *

UNITED STATES PATENT AND TRADEMARK OFFICE
CERTIFICATE OF CORRECTION

PATENT NO. : 5,818,612
DATED : October 6, 1998
INVENTOR(S) : Satoshi SEGAWA

It is certified that error appears in the above-identified patent and that said Letters Patent is hereby corrected as shown below:

On the title page,

In Item No. [30], Foreign Application Priority Data, change "6-291460" to --6-294160--.

Col. 1, line 22, change "arc" to --are--.

Signed and Sealed this

Fourth Day of May, 1999

Attest:

Q. TODD DICKINSON

*Attesting Officer*　　　Acting Commissioner of Patents and Trademarks